United States Patent [19]

Endo et al.

[11] Patent Number: 4,833,203

[45] Date of Patent: May 23, 1989

[54] POLYCARBONATE COMPOSITION

[75] Inventors: Hideki Endo; Kazuto Hashimoto, both of Ichihara; Kohji Kato, Yamato, all of Japan

[73] Assignees: Idemitsu Petrochemical Co., Ltd.; Nippon Zeon Co., Ltd., both of Tokyo, Japan

[21] Appl. No.: 212,707

[22] Filed: Jun. 28, 1988

[30] Foreign Application Priority Data

Jun. 29, 1987 [JP] Japan .............................. 62-159728
Jun. 29, 1987 [JP] Japan .............................. 62-159729

[51] Int. Cl.$^4$ ............................................. C08L 69/00
[52] U.S. Cl. ...................................... 525/67; 525/69; 525/439; 525/468
[58] Field of Search .................... 525/67, 64, 69, 439, 525/468, 148

[56] References Cited

U.S. PATENT DOCUMENTS 4,657,973 4/1987 Endo et al. ........................ 525/67

*Primary Examiner*—Theodore E. Pertilla
*Attorney, Agent, or Firm*—Antonelli, Terry & Wands

[57] ABSTRACT

A polycarbonate composition comprising (A) 100 parts by weight of a polycarbonate resin and (B) 1 to 80 parts by weight of an isoprene-base graft copolymer, wherein; said isoprene-base graft copolymer (B) is prepared by polymerizing (a) 20 to 100 parts by weight of one or more vinyl monomers selected from the group consisting of acrylic esters, methacrylic esters, aromatic monovinyl compounds, and cyanovinyl compounds, and (b) 0 to 5 parts by weight of a polyfunctional vinyl monomer in the presence of (c) 100 parts by weight of a copolymer having an isoprene content of 5 to 100% by weight and an acrylic ester content of 0 to 95% by weight has excellent thermal stability, low temperature impact resistance, jet-black colorability, and solvent resistance. Such a polycarbonate composition is suitable as a material for moldings in the fields of automobiles, home electric appliances, etc.

13 Claims, No Drawings

POLYCARBONATE COMPOSITION

BACKGROUND OF THE INVENTION (a) Field of the Invention

The present invention relates to polycarbonate compositions. More particularly, the present invention relates to polycarbonate compositions which exhibit excellent thermal stability, low temperature impact resistance, jet-black colorability, solvent resistance etc. Such polycarbonate compositions can be suitably used as molding materials for moldings in automobile manufacture fields such as automobile bumpers and home electric appliances.

(b) Description of the related art

Polycarbonates are known as being excellent engineering plastics due to their good molding accuracy in addition to their excellences in mechanical strength, such as tensile strength, bending strength, and impact strength, and thermal resistance and are therefore widely utilized in various fields. The conventional polycarbonates however have some deficiencies such as their inferiorities in low temperature impact resistance, solvent resistance, and flowability.

In order to eliminate such deficiencies of polycarbonates, there have been proposed several polycarbonate composition, such as polycarbonate compositions in which acrylic rubbers are blended (See, e.g., Japanese Patent Publications No. 18,611/68 and No. 29,308/73, Japanese Patent Laid-opens No. 34,153/78 and No. 143,239/81.), polycarbonate compositions in which polyester-ether elastomers are blended (See, e.g., Japanese Patent Publication No. 26,538/82.), and polycarbonate compositions in which polyester resins and acrylic rubbers are blended (See, e.g., Japanese Patent Publication No. 9,435/80 and Japanese Patent Laid-opens No. 129,246/78 and No. 93,748/84.).

Nevertheless, although these compositions have been improved in solvent resistance and flowability in some degree, the improvement in low temperature impact resistance is still insufficient. Further, probably owing to the presence of the rubber ingredients therein, these compositions have been degraded in thermal stability and jet-black colorability (resulting in parl-like colored appearance), and the injection-molded products therefrom tend to delaminate. These deficiencies limit the fields of the utilization of these compositions.

SUMMARY OF THE INVENTION

The object of the present invention is to eliminate such deficiencies of the conventional polycarbonate compositions in which acrylic rubbers, polyester-ether elastomers, and polyester resins and acrylic rubbers are blended respectively and to provide improved polycarbonate compositions which exhibit excellent thermal stability, low temperature impact resistance, jet-black colorability, solvent resistance, etc. and as well generate no delamination in moldings therefrom when injection molded.

In order to develop polycarbonate compositions having the excellent properties mentioned above, the present inventors carried out various studies. As the results of the studies, the inventors found that the object can be achieved by blending an isoprene-base graft copolymer having a specific components into polycarbonate resins in a specified ratio and eventually made the present invention.

That is, the present invention provides a polycarbonate composition comprising (A) 100 parts by weight of a polycarbonate resin and (B) 1 to 80 parts by weight of an isoprene-base graft copolymer, wherein; said isoprene-base copolymer (B) is prepared by polymerizing (a) 20 to 100 parts by weight of one or more vinyl monomers selected from the group consisting of acrylic esters, methacrylic esters, aromatic monovinyl compounds, and cyanovinyl compounds, and (b) 0 to 5 parts by weight of a polyfunctional vinyl monomer in the presence of (c) 100 parts by weight of a copolymer having an isoprene content of 5 to 100% by weight and an acrylic ester content of 0 to 95% by weight.

DESCRIPTION OF THE PREFERRED EMBODIMENTS

The polycarbonate resin which can be used as the (A) component in the present invention is a polymer comprising the repeating units represented by the following general formula (I):

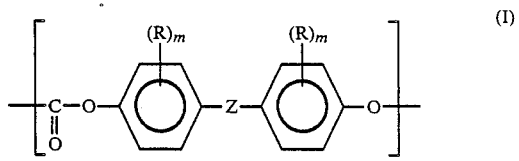

wherein

Z represents single bonding, ether bonding, alkylene radicals of 1 to 8 carbon atoms, alkylidene radicals of 2 to 8 carbon atoms, cycloalkylene radicals of 5 to 15 carbon atoms, cycloalkylidene radicals of 5 to 15 carbon atoms, sulfonyl radical, thionyl radical, carbonyl radical or the radical having the following formula:

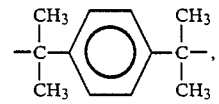

each R independently represents hydrogen, chlorine, bromine or alkyl radicals of 1 to 8 carbon atoms, and each m independently is an integer of 1 to 4.

The polycarbonate resins can be prepared by using known solvent techniques. That is, the polycarbonate resins can be prepared by either the reaction of a dihydric phenol with a carbonate precursor, particularly phosgene, or the transesterification reaction between a dihydric phenol and a carbonate precursor such as diphenyl carbonate, in a solvent such as methylene chloride and in the presence of a known acid acceptor and a molecular weight regulator.

Typical examples of the dihydric phenols which can be suitably used in the present invention are bisphenols and, particularly, 2,2-bis(4-hydroxyphenyl) propane (bisphenol A) is preferable. Also, a part or all of bisphenol A may be replaced by other dihydric phenols when used. The illustrative examples of the dihydric phenols other than bisphenol A which can be used in the present invention include bis (4-hydroxyphenyl) alkanes other than bisphenol A, hydroquinone, 4,4'-dihydroxydiphenyl, bis(4-hydroxyphenyl) cycloalkanes, bis(4-hydroxyphenyl)sulfide, bis(4-hydroxyphenyl)sulfone, bis(4- hydroxyphenyl)sulfoxide, bis(4-hydroxyphenyl)ether, and halogenized bisphenols such as bis(3,5-dibromo-4-hydroxyphenyl)propane and bis)3,5-dichloro-4-hydroxyphenyl)propane. The polycarbonate resins to be used in the present invention may be a homopolymer derived from one of these dihydric phenols, a copolymer derived from two or more of these dihydric phenols, or a blend thereof.

Further, the polycarbonate resins to be used in the present invention may also be a thermoplastic, random branched polycarbonate prepared by reacting a polyfunctional aromatic compound with a dihydric phenol and/or a carbonate precursor.

From the viewpoint of the mechanical strengths and moldability, the preferred polycarbonate resins to be used in the present invention are those having a viscosity average molecular weight of 10,000 to 100,000, more preferably 20,000 to 40,000.

The isoprene-base graft copolymer to be used as (B) component in the present invention is a graft copolymer obtained by polymerizing
   (a) 20 to 100 parts by weight of one or more vinyl monomers selected from the group consisting of acrylic esters, methacrylic esters, aromatic monovinyl compounds, and cyanovinyl compounds, and
   (b) 0 to 5 parts by weight of a polyfunctional vinyl monomer in the presence of
   (c) 100 parts by weight of a copolymer having an isoprene content of 5 to 100% by weight and an acrylic ester content of 0 to 95% by weight.

If the acrylic ester content in the above-mentioned (c) component which is to be used in the preparation of isoprene-base graft copolymers (B) exceeds 95% by weight, the low temperature impact resistance is decreased. The preferred acrylic ester content is 50 to 90% by weight.

If the amount of the (a) component used, vinyl monomer used, is less than 20 parts by weight based on 100 parts by weight of the copolymer (c), the resulting graft copolymers cannot effectively disperse in the polycarbonate composition resulting in the poor jet-black colorability and poor appearance of the product polycarbonate compositions. On the other hand, if it exceeds 100 parts by weight, the impact resistance of the polycarbonate compositions will decreases.

The object in blending the polyfunctional vinyl monomer (b) is to further increase the low temperature impact resistance of the polycarbonate compositions. However, even if the amount of the (b) component exceeds 5 parts by weight based on 100 parts by weight of the copolymer (c), the low temperature impact resistance cannot be increased furthermore. The particularly preferred amount of the polyfunctional vinyl monomer (b) is 0.1 to 2 parts by weight.

The illustrative examples of the acrylic esters to be used for providing the acrylic ester units in the copolymer (c) include ethyl acrylate, butyl acrylate, 2-ethylhexyl acrylate, n-octyl acrylate, isononyl acrylate, methoxyethyl acrylate, and hydroxyethyl acrylate. These acrylic esters may be used either individually or in a mixture of two or more of them.

The illustrative examples of the acrylic esters which may be used as the vinyl monomers (a) include those listed above for the above-mentioned acrylic esters. The illustrative examples of the methacrylic esters which may be used include methyl methacrylate, ethyl methacrylate, butyl methacrylate, methoxyethyl methacrylate, and glycidyl methacrylate. The illustrative examples of the aromatic monovinyl compounds which may be used include styrene, α-methylstyrene, vinyltoluenes, vinylxylenes, and halogenized styrenes. The illustrative examples of the cyanovinyl compounds which may be used include acrylonitrile and methacrylonitrile. These vinyl monomers may be used either individually or in a combination of two or more of them.

The illustrative examples of the polyfunctional vinyl monomers (b) which may be used in the present invention include divinylbenzenes, divinyltoluenes, ethyleneglycol diacrylate, ethyleneglycol dimethacrylate, polyethyleneglycol diacrylate, polyethyleneglycol dimethacrylate, 1,3-butanediol diacrylate, diallyl phthalate, triallyl trimelitate, diallyl maleate, and trimethylopropane trimethacrylate. These polyfunctional vinyl monomers may be used either individually or in a combination of two or more of them.

The isoprene-base graft copolymer to be used as the (B) component in the present invention can be prepared by polymerizing the vinyl monomer (a) and the polyfunctional vinyl monomer (b) in the above-described ratio of amount, in the presence of the copolymer (c), by means of a known polymerization technique such as bulk polymerization, suspension polymerization, emulsion polymerization, etc. The preferred polymerization technique to be employed is emulsion polymerization.

The average particle size of thus prepared isoprene-base graft copolymers is not to be particularly limited, but, from the viewpoint of the improvement of the low temperature impact resistance and solvent resistance of the product polycarbonate compositions, the preferred range of the average particle size is from 0.1 to 0.3 μm, and the particularly preferred is from 0.15 to 0.25 μm.

The amount of the isoprene-base graft copolymers (B) contained in the polycarbonate compositions of the present invention should be 1 to 80 parts by weight, preferably 2 to 60 parts by weight, based on 100 parts by weight of the polycarbonate resins (A). If the amount of (B) is less than 1 part by weight, the low temperature impact resistance of the polycarbonate compositions will not increase and, on the other hand, if it exceeds 80 parts by weight, the jet-black colorability and the stiffness will be decreased.

The polycarbonate compositions of the present invention can be improved in the solvent resistance by blending a specific polyester-ether elastomer (C) thereto in addition to the above-described components, i.e. the polycarbonate resins (A) and isoprene-base graft copolymers (B). Accordingly, the present invention also contemplates a polycarbonate composition comprising, in addition to the polycarbonate resins (A) and the isoprene-base graft copolymers (B), (C) 4 to 150 parts by weight of a polyester-ether elastomer, wherein; said (C) polyester-ether elastomer is prepared by polycondensing
   (d) one or more dicarboxylic acids and/or derivatives therefrom capable of forming esters containing at least 70 mol % of terephthalic acid and/or its derivative capable of forming esters,
   (e) an alkylene glycol, and
   (f) a polyalkyleneglycol having an average molecular weight of 500 to 5,000
in such a ratio of amounts as the resulting polyester-ether elastomer (C) has a component (f) content of 20 to 80% by weight.

The component (d) used in the preparation of the polyester-ether elastomers (C) consists of one or more dicarboxylic acids and/or derivatives therefrom capable of forming esters and contains at least 70 mol % of terephthalic acid and/or its derivative capable of forming esters. The dicarboxylic acid other than terephthalic acid can be either an aliphatic dicarboxylic acid, an alicyclic dicarboxylic acid or an aromatic dicarboxylic acid. The dicarboxylic acids which can be usually employed in the present invention are those having a molecular weight of not more than 300, and some illustrative examples of such dicarboxylic acids include aliphatic dicarboxylic acids such as adipic acid and sebacic acid, alicyclic dicarboxylic acids such as cyclohexane dicarboxylic acids, and aromatic dicarboxylic acids such as isophthalic acid and naphthalene dicarboxylic acids. The illustrative examples of the derivatives capable of forming esters which can be employed in the present invention include acid anhydrides, esters, and acid chlorides which are derived from terephthalic acid or the above-described dicarboxylic acids.

The illustrative examples of the alkylene glycols (e) include ethylene glycol, propylene glycols, and tetramethylene glycols. These may be used either individually or in a combination of two or more of them.

The preferred polyalkyleneglycols (f) having an average molecular weight of 500 to 5,000 are those in which number ratio of carbon atoms to oxygen atoms in each molecule ranges from 2.0 to 4.3. The illustrative examples of such polyalkyleneglycols include polytetramethyleneglycol, polyethyleneglycol, polypropyleneglycol, and copolymers thereof and, among these, the particularly preferred are polytetramethyleneglycol and polyethyleneglycol. These may be employed either individually or in a combination of two or more of them.

The polyalkyleneglycol (f) content of the polyester-ether elastomer (C) is 20 to 80% by weight, preferably 30 to 80% by weight, more preferably 50 to 80% by weight. The preferred polymerization degree of the polyester-ether elastomers (C) is 0.5 to 5.0, more preferably 0.7 to 4, in reduced viscosity as measured in o-chlorophenol at a concentration of 1.2 g/100 ml at a temperature of 35° C.

According to the present invention, 4 to 150 parts by weight, preferably 10 to 100 parts by weight, of the polyester-ether elastomer (C) is blended based on 100 parts by weight of the polycarbonate resins (A) in order to improve the solvent resistance of the polycarbonate compositions of the present invention. If the amount of the polyester-ether elastomers (C) is less than 4 parts by weight, the solvent resistance of the polycarbonate compositions cannot be improved and, on the other hand, if it exceeds 150 parts by weight, the low temperature impact resistance will be decreased.

Alternatively, the polycarbonate compositions of the present invention can also be improved in the solvent resistance by blending an aromatic polyester. Accordingly, the present invention also contemplates a polycarbonate composition comprising, in addition to the above-mentioned polycarbonate resins (A) and isoprene-base graft copolymers (B), (D) 4 to 150 parts by weight of an aromatic polyester resin.

Various aromatic polyesters can be employed as the aromatic polyester resins (D) in the present invention, and the particularly preferred are polyester resins obtained by polycondensing a difunctional carboxylic acid and an alkylene glycol.

The illustrative examples of the difunctional carboxylic acids which can be employed include aromatic dicarboxylic acids such as terephthalic acid, isophthalic acid, and naphthalene dicarboxylic acids. Among these, terephthalic acid is preferable, and other difunctional carboxylic acids also can be used together with the aromatic dicarboxylic acids within the limits not to injure the effects of the present invention. The illustrative examples of the difunctional carboxylic acids other than the aromatic dicarboxylic acids include aliphatic dicarboxylic acids such as oxalic acid, malonic acid, adipic acid, suberic acid, azelaic acid, sebacic acid, and decane dicarboxylic acids and derivatives therefrom capable of forming esters. It is generally preferable to limit the amount of dicarboxylic acids other than the above-mentioned aromatic dicarboxylic acids to not more than 20 mol % of the total amount of the dicarboxylic acids.

The alkylene glycols which can be employed is not to be limited. The illustrative examples of the alkylene glycol which can be used include aliphatic diols of 2 to 15 carbon atoms, such as ethylene glycol, propylene-1,2-glycol, propylene-1,3-glycol, butylene-1,4-glycol, butylene-2,3-glycol, hexane-1,6-diol, octane-1,8-diol, neopentyl glycol, and decane-1,10-diol. Among these, ethylene glycol and butylene glycols are preferable.

The particularly preferred polyesters to be used as the aromatic polyester resins (D) are polyethyleneterephthalate and polybutyleneterephthalates.

The aromatic polyester resins (D) can be prepared employing well known methods in the art in the presence or absence of a polycondensation catalyst containing titanium, germanium, antimony, etc. For example, polyethyleneterephthalate can be usually prepared by a method comprising two steps wherein: in the first step, glycol ester of terephthalic acid and/or its polymer of low polymerization degree is prepared by esterifying terephthalic acid with ethylene glycol or by carrying out the transesterification between a lower-alkyl ester of terephthalic acid such as dimethyl terephthalate and ethylene glycol and, in the second stage, the obtained glycol ester and/or its polymer of low polymerization degree is further polymerized to prepare a polymer of high polymerization degree.

The amount of the aromatic polyester resins (D) to be blended in the polycarbonate composition of the present invention is 4 to 150 parts by weight, preferably 10 to 100 parts by weight, based on 100 parts by weight of the polycarbonate resins (A). If the amount is less than 4 parts by weight, the solvent resistance of the polycarbonate compositions cannot be improved, and, if it exceeds 150 parts by weight, the low temperature impact resistance decreases.

Of course, the solvent resistance of the polycarbonate compositions of the present invention can be also improved by blending both of the polyester-ether elastomers (C) and the aromatic polyester resins (D). Accordingly, the present invention also contemplates a polycarbonate composition comprising, in addition to the polycarbonate resins (A) and the isoprene-base graft copolymers (B), 4 to 150 parts by weight of the polyester-ether elastomers (C) and 4 to 150 parts by weight of the aromatic polyester resins (D).

Also, the polycarbonate compositions of the present invention may further contain inorganic fillers, various additives known in the art, other synthetic resins, elastomers, etc., at need, within the limits not to injure the effects of the present invention.

The object in blending the inorganic fillers is to increase the mechanical strengths and durability of polycarbonate compositions or to extend them. The illustrative examples of the inorganic fillers which may be used include glass fibers, glass beads, glass flakes, carbon black, calcium sulfate, calcium carbonate, calcium silicate, titanium oxide, alumina, silica, asbestos, talc, clay, mica, quarts powder, etc. The illustrative examples of the above-mentioned various additives include antioxidants such as hindered phenol antioxidants, phosphorus antioxidants such as phosphorous ester antioxidants, and phosphoric ester antioxidants, and the like, UV absorbers such as benzotriazole UV absorbers, benzophenone UV absorbers, and the like, external lubricants such as aliphatic carboxylic ester lubricants, paraffin lubricants, and the like, usual flame retardants, release agents, anti-static agents, colorants, and so forth.

The preferred hindered phenol antioxidants include 2,6-di-tert-butyl-p-cresol (BHT), Irganox 1076 (trade name, produced by Ciba-Geigy AG), Irganox 1010 (trade name, produced by Ciba-Geigy AG), "Ethyl" Antioxidant 330 (trade name, produced by Ethyl Co., Ltd.), Sumilizer GM (trade name, produced by Sumitomo Chemical Co., Ltd.), etc. Illustrative examples of the above-mentioned other synthetic resins include polyethylene, polypropylene, polystyrene, AS resin, ABS resin, polymethylmethacrylate, etc. Illustrative examples of the above-mentioned elastomers include isobutylene-isoprene rubber, styrene-butadiene rubber, ethylene-propylene rubber, acrylic elastomers, etc.

The polycarbonate compositions of the present invention can be prepared by blending the polycarbonate resins (A) with isoprene-base graft copolymers (B) as an essential component and, at need, the polyester-ether elastomers (C), the aromatic polyester resins (D), and the above-described various additives in the above-specified ratio of amounts and then kneading the blends. Blending and kneading can be carried out by known means usually employed in the art such as by means of a ribbon blender, a Henschel mixer, a Bambury mixer, a drum tumbler, a single-screw extruder, a twin-screw extruder, a co-kneader, and a multi-screw extruder. The suitable range of the heating temperature at the time of kneading is usually 250° to 300° C.

Thus obtained polycarbonate compositions can be formed into moldings in automobile manufacture fields such as automobile bumpers, moldings in home electric appliances, and the like, by the use of various known forming methods in the art such as injection molding, extruding molding, compression molding, calender molding, and rotational molding.

The polycarbonate compositions of the present invention are excellent in thermal stability, low temperature impact resistance, jet-black colorability, solvent resistance, etc. and therefore can be suitably used as materials for moldings in automobile production fields such as automobile bumpers, moldings in home electric appliances, and the like.

The following examples are set forth to more fully and clearly illustrate the present invention and are intended to be, and should be construed as being, exemplary and not limitative of the invention.

EXAMPLES AND COMPARATIVE EXAMPLES

In the following examples and comparative examples, the properties of the resin compositions were determined as followings.

(1) Izod impact strength was measured according to ASTM D 256 (temperature: −30° C.)

(2) Thermal stability was determined by allowing each resin composition to stay in a capillary at 300° C. for 15 minutes and then visually observing the state of the extruded strand.

O: good

Δ: slight foaming and discoloration x: severe foaming and discoloration (3) Solvent resistance was determined according to ¼ oval method (Nakatsuji et al, Shikizai, 39, p 455, 1966). The numeric representing the solvent resistance in the tables 1 to 3 shows the critical strain measured after immersion in a solvent mixture of toluene/isooctane/methanol=42.5/42.5/15 (% by volume) for 5 minutes.

(4) Jet-black colorability was determined by adding 0.3 parts by weight of carbon black to 100 parts by weight of each resin composition, injection-molding the resulting mixture into a plate having a length of 80 mm, width of 80 mm, and thickness of 3.2 mm, and then visually observing the appearance of the plate.

O: black chromaticity: high, tone: even

Δ: black chromaticity: ordinary, tone: slightly uneven x: black chromaticity: low, tone: uneven

PREPARATION EXAMPLE 1

Preparation of isoprene-base graft copolymer

Into a pressure reactor were charged 200 parts by weight of water purified by ion-exchange purification, 3 parts by weight of sodium lauryl sulfate, 0.3 parts by weight of potassium persulfate, and 0.2 parts by weight of sodium carbonate. After the atmosphere was sufficiently replaced with nitrogen, 100 parts by weight of isoprene was added. The temperature was elevated to 50° C. and the mixture was then polymerized for 60 hours.

Subsequently, to the reaction mixture were added 80 parts by weight of water purified by ion-exchange purification, 0.01 part by weight of ferrous sulfate, 0.3 parts by weight of sodium formaldehyde sulfoxylate, and 0.1 part by weight of cumene hydroperoxide and the mixture was dissolved and admixed. To the mixture was continuously added 40 parts by weight of methyl methacrylate over 4 hours while maintaining the temperature at 50° C. and the mixture was subsequently reacted for 3 hours to carry out polymerization.

After completion of the reaction, the obtained latex was coagulated by adding into a 0.1% by weight aqueous solution of aluminum sulfate. At the time of coagulation, to the aqueous solution of aluminum sulfate was added 0.5 parts by weight of a hindered phenol antioxidant, Irganox 1076 (trade name, produced by Ciba-Geigy AG), based on 100 parts by weight of the polymer.

The coagulated rubber was washed with water and dried to obtain the objective graft copolymer having an average particle size of 0.22 μm.

PREPARATION EXAMPLE 2 preparation of isoprene-base graft copolymer

The procedure of preparation example 1 was repeated with the exception that a mixture of 10 parts by weight of acrylonitrile, 30 parts by weight of styrene, and 0.5 parts by weight of divinylbenzene were used in place of 40 parts by weight of methyl methacrylate to prepare a graft copolymer.

PREPARATION EXAMPLE 3 preparation of acrylate-isoprene-base graft copolymer

Into a pressure reactor were charged 200 parts by weight of water purified by ion-exchange purification, 2 parts by weight of sodium dodecyl diphenyl ether disulfonate, 0.2 parts by weight of potassium persulfate, 0.5 parts by weight of sodium sulfate, and 80 parts by weight of butyl acrylate. After the atmosphere was sufficiently replaced with nitrogen, 20 parts by weight of isoprene was added. The temperature was then elevated to 60° C. and polymerization was carried out for 30 hours.

Subsequently, to the reaction mixture was added 80 parts by weight of water purified by ion-exchange purification, 0.01 part by weight of ferrous sulfate, 0.3 parts by weight of sodium formaldehyde sulfoxylate, and 0.1 part by weight of cumene hydroperoxide and the mixture was dissolved and admixed. To the mixture was continuously added a mixture of 10 parts by weight of acrylonitrile and 30 parts by weight of styrene over 4 hours while maintaining the temperature at 60° C. The mixture was then reacted for further 3 hours to carry out polymerization.

After completion of the reaction, the obtained latex was coagulated by introduction into a 0.05% by weight aqueous solution of aluminum sulfate. At the time of coagulation, to the aqueous solution of aluminum sulfate was added 0.5 parts by weight of a hindered phenol antioxidant, Irganox 1076 (trade name, produced by Ciba-Geigy AG), based on the amount of the polymer.

The coagulated rubber was washed with water and dried to obtain the objective graft copolymer having an average particle size of 0.18 μm.

PREPARATION EXAMPLE 4 preparation of acrylate-isoprene-butadiene graft copolymer

The procedure of preparation example 3 was repeated with the exception that 70 parts by weight of 2-ethylhexyl acrylate was charged in place of 80 parts by weight of butyl methacrylate and, after sufficient replacement of the atmosphere with nitrogen, 20 parts by weight of butadiene and 10 parts by weight of isoprene were added in place of 20 parts by weight of isoprene, to prepare the objective graft copolymer.

EXAMPLES 1 TO 9 AND COMPARATIVE EXAMPLES 1 TO 7

To 100 parts by weight of a bisphenol A type polycarbonate resin (produced by Idemitsu Petrochemical Co., Ltd., trade name: Idemitsu Polycarbonate A-3000, viscosity average molecular weight: 29,300) were blended a polyester-ether elastomer (produced by Toyobo Co., Ltd., trade name: Pelprene P-150B), each isoprene-base graft copolymer prepared in preparation examples 1 to 4 respectively or a commercial graft copolymer in the ratio of amount shown in Table 1. Each blend was kneaded at 270° C. to obtain pellets. The pellets were subjected to the above-mentioned tests and the results are shown in Table 1.

EXAMPLES 10 TO 23

To 100 parts by weight of a bisphenol A type polycarbonate resin (produced by Idemitsu Petrochemical Co., Ltd., trade name: Idemitsu Polycarbonate A-3000, viscosity average molecular weight: 29,300) were blended each aromatic polyester resin shown in Table 2, each isoprene-base graft copolymer obtained in preparation examples 1 to 4 respectively, and a polyester-ether elastomer (produced by Toyobo Co., Ltd., trade name: Pelprene P-150B) in the ratio of amounts shown in Table 2. Each blend was kneaded at 270° C. to obtain pellets. The pellets were subjected to the above-mentioned tests and the results are shown in Table 2.

COMPARATIVE EXAMPLES 8 TO 17

The procedure of the above-described examples was repeated with the exception that the isoprene-base graft copolymers were changed as shown in Table 3 to prepare pellets. The pellets were subjected to the above-mentioned tests and the results are shown in Table 3.

The kinds of graft copolymers and aromatic polyester resins used are as follows.

W 529: Produced by Mitsubishi Rayon Co., Ltd., Trade name: Methaburene W 529,
 A copolymer prepared by graft-polymerizing styrene and methyl methacrylate to acrylic rubber (MBS resin)

KM 330: Produced by Rohm & Haas Co., Ltd., Trade name: Paraloid KM 330 (MAS resin)

HIA 15: Produced by Kureha Chemical Industry Co., Ltd., Trade name: HIA 15,
 A graft copolymer prepared by graft-polymerizing styrene and methyl methacrylate to a rubber latex prepared by copolymerizing octyl acrylate and butadiene (MABS resin)

AA 220: Produced by Mitsubishi Rayon Co., Ltd.,

PET, [n] 1.20 dl/g

MA 523: Produced by Mitsubishi Rayon Co., Ltd.,

PET, [n] 0.78 dl/g

2002: Produced by Polyplastic Co., Ltd.,

PET, [n] 1.06 dl/g

TABLE 1

| | (B) Graft copolymer | | (C) Polyester-ether elastomer | Test Results | | | |
| | | | | Izod impact strength | Thermal | | Jet-black |
| | Type | Part by weight | Part by weight | (−30° C.) kg · cm/cm | stability | Solvent resistance | colorability |
|---|---|---|---|---|---|---|---|
| Example 1 | Preparation example 1 | 10 | 0 | 65 | | 0.51 | |
| Example 2 | Preparation example 2 | 10 | 0 | 62 | | 0.52 | |
| Example 3 | Preparation example 3 | 10 | 0 | 60 | | 0.51 | |
| Example 4 | Preparation example 4 | 10 | 0 | 60 | | 0.52 | |
| Example 5 | Preparation example 3 | 5 | 0 | 55 | | 0.30 | |

TABLE 1-continued

| | (B) Graft copolymer | | (C) Polyester-ether elastomer | Test Results | | | |
|---|---|---|---|---|---|---|---|
| | Type | Part by weight | Part by weight | Izod impact strength (−30° C.) kg · cm/cm | Thermal stability | Solvent resistance | Jet-black colorability |
| Example 6 | Preparation example 3 | 30 | 0 | 60 | | 0.75 | |
| Example 7 | Preparation example 3 | 60 | 0 | 61 | | 1.0< | Δ |
| Example 8 | Preparation example 3 | 10 | 20 | 50 | | 0.81 | |
| Example 9 | Preparation example 3 | 30 | 60 | 45 | | 1.0< | |
| Comparative example 1 | KM 330 | 10 | 0 | 50 | x | 0.52 | x |
| Comparative example 2 | W 529 | 10 | 0 | 18 | x | 0.45 | |
| Comparative example 3 | HIA 15 | 10 | 0 | 50 | x | 0.49 | |
| Comparative example 4 | KM 330 | 30 | 0 | 60 | x | 0.71 | x |
| Comparative example 5 | KM 330 | 60 | 0 | 62 | x | 1.0< | x |
| Comparative example 6 | KM 330 | 10 | 20 | 45 | x | 0.78 | x |
| Comparative example 7 | KM 330 | 30 | 60 | 40 | x | 1.0< | x |

TABLE 2

| | (B) Graft copolymer | | (C) Polyester-ether elastomer | | (D) Aromatic polyester resin | | Test results | | | |
|---|---|---|---|---|---|---|---|---|---|---|
| | Type | Part by weight | Type | Part by weight | Type | Part by weight | Izod impact strength (−30° C.) kg · cm/cm | Thermal stability | Solvent resistance | Jet-black colorability |
| Example 10 | Preparation example 1 | 30 | — | 0 | MA 523 | 70 | 55 | | 0.51 | |
| Example 11 | Preparation example 2 | 30 | — | 0 | MA 523 | 70 | 40 | | 0.52 | |
| Example 12 | Preparation example 3 | 30 | — | 0 | MA 523 | 70 | 35 | | 0.51 | |
| Example 13 | Preparation example 4 | 30 | — | 0 | MA 523 | 70 | 40 | | 0.51 | |
| Example 14 | Preparation example 3 | 50 | — | 0 | MA 523 | 100 | 30 | | 0.70 | |
| Example 15 | Preparation example 1 | 30 | P-150 B | 35 | MA 523 | 35 | 50 | | 0.71 | |
| Example 16 | Preparation example 2 | 30 | P-150 B | 35 | MA 523 | 35 | 40 | | 0.72 | |
| Example 17 | Preparation example 3 | 30 | P-150 B | 35 | MA 523 | 35 | 40 | | 0.72 | |
| Example 18 | Preparation example 4 | 30 | P-150 B | 35 | MA 523 | 35 | 35 | | 0.71 | |
| Example 19 | Preparation example 3 | 50 | P-150 B | 50 | MA 523 | 50 | 30 | | 1.0< | |
| Example 20 | Preparation example 3 | 30 | P-150 B | 35 | AA 200 | 35 | 40 | | 0.82 | |
| Example 21 | Preparation example 3 | 50 | P-150 B | 50 | AA 200 | 50 | 35 | | 1.0< | |
| Example 22 | Preparation example 3 | 30 | P-150 B | 35 | 2002 | 35 | 45 | | 1.0 | |
| Example 23 | Preparation example 3 | 30 | — | 0 | 2002 | 70 | 40 | | 0.91 | |

TABLE 3

| | (B) Graft copolymer | | (C) Polyester-ether elastomer | | (D) Aromatic polyester resin | | Test results | | | |
|---|---|---|---|---|---|---|---|---|---|---|
| | Type | Part by weight | Type | Part by weight | Type | Part by weight | Izod impact strength (−30° C.) kg · cm/cm | Thermal stability | Solvent resistance | Jet-black colorability |
| Comparative Example 8 | HIA 15 | 30 | — | 0 | MA 523 | 70 | 20 | x | 0.51 | Δ |
| Comparative Example 9 | KM 330 | 30 | P-150 B | 35 | MA 523 | 35 | 35 | x | 0.72 | x |
| Comparative Example 10 | W 529 | 50 | P-150 B | 50 | MA 523 | 50 | 15 | x | 0.91 | Δ |
| Comparative Example 11 | KM 330 | 30 | — | 0 | AA 200 | 70 | 40 | x | 0.62 | x |
| Comparative Example 12 | HIA 15 | 30 | P-150 B | 35 | AA 200 | 35 | 15 | x | 0.82 | Δ |

TABLE 3-continued

| | (B) Graft copolymer | | (C) Polyester-ether elastomer | | (D) Aromatic polyester resin | | Test results | | | |
|---|---|---|---|---|---|---|---|---|---|---|
| | Type | Part by weight | Type | Part by weight | Type | Part by weight | Izod impact strength (−30° C.) kg · cm/cm | Thermal stability | Solvent resistance | Jet-black colorability |
| Comparative Example 13 | KM 330 | 30 | — | 0 | 2002 | 70 | 35 | x | 0.65 | x |
| Comparative Example 14 | HIA 15 | 30 | P-150 B | 15 | 2002 | 35 | 25 | x | 0.60 | Δ |
| Comparative Example 15 | Preparation example 3 | 5 | P-150 B | 3 | MA 523 | 3 | 60 | | 0.30 | |
| Comparative Example 16 | Preparation example 3 | 100 | P-150 B | 50 | MA 523 | 100 | 10 | | 1.0< | |
| Comparative Example 17 | Preparation example 3 | 100 | — | 0 | MA 523 | 70 | 65 | | 1.0< | Δ-x |

What is claimed is:

1. A polycarbonate composition comprising (A) 100 parts by weight of a polycarbonate resin and (B) 1 to 80 parts by weight of an isoprene-base graft copolymer, wherein;
said isoprene-base graft copolymer (B) is prepared by polymerizing
  (a) 20 to 100 parts by weight of one or more vinyl monomers selected from the group consisting of acrylic esters, methacrylic esters, aromatic monovinyl compounds, and cyanovinyl compounds, and
  (b) 0 to 5 parts by weight of a polyfunctional vinyl monomer in the presence of
  (c) 100 parts by weight of a copolymer having an isoprene content of 5 to 100% by weight and an acrylic ester content of 0 to 95% by weight.

2. A polycarbonate composition comprising (A) 100 parts by weight of a polycarbonate resin, (B) 1 to 80 parts by weight of an isoprene-base graft copolymer, and (C) 4 to 150 parts by weight of a polyester-ether elastomer, wherein;
said isoprene-base graft copolymer (B) is prepared by polymerizing
  (a) 20 to 100 parts by weight of one or more vinyl monomers selected from the group consisting of acrylic esters, methacrylic esters, aromatic monovinyl compounds, and cyanovinyl compounds, and
  (b) 0 to 5 parts by weight of a polyfunctional vinyl monomer in the presence of
  (c) 100 parts by weight of a copolymer having an isoprene content of 5 to 100% by weight and an acrylic ester content of 0 to 95% by weight;
and said polyester-ether elastomer (C) is prepared by polycondensing
  (d) one or more dicarboxylic acids and/or derivatives therefrom capable of forming esters containing at least 70 mol % of terephthalic acid and/or its derivative capable of forming esters,
  (e) an alkylene glycol, and
  (f) a polyalkyleneglycol having an average molecular weight of 500 to 5,000
in such a ratio of amounts as the resulting polyester-ether elastomer (C) has a (f) content of 20 to 80% by weight.

3. A polycarbonate composition comprising (A) 100 parts by weight of a polycarbonate resin, (B) 1 to 80 parts by weight of an isoprene-base graft copolymer, and (D) 4 to 150 parts by weight of an aromatic polyester resin, wherein;
said isoprene-base graft copolymer (B) is prepared by polymerizing
  (a) 20 to 100 parts by weight of one or more vinyl monomers selected from the group consisting of acrylic esters, methacrylic esters, aromatic monovinyl compounds, and cyanovinyl compounds, and
  (b) 0 to 5 parts by weight of a polyfunctional vinyl monomer in the presence of
  (c) 100 parts by weight of a copolymer having an isoprene content of 5 to 100% by weight and an acrylic ester content of 0 to 95% by weight.

4. A polycarbonate composition comprising (A) 100 parts by weight of a polycarbonate resin, (B) 1 to 80 parts by weight of an isoprene-base graft copolymer, (C) 4 to 150 parts by weight of a polyester-ether elastomer, and (D) 4 to 150 parts by weight of an aromatic polyester resin, wherein;
said isoprene-base graft copolymer (B) is prepared by polymerizing
  (a) 20 to 100 parts by weight of one or more vinyl monomers selected from the group consisting of acrylic esters, methacrylic esters, aromatic monovinyl compounds, and cyanovinyl compounds, and
  (b) 0 to 5 parts by weight of a polyfunctional vinyl monomer in the presence of
  (c) 100 parts by weight of a copolymer having an isoprene content of 5 to 100% by weight and an acrylic ester content of 0 to 95% by weight;
and said polyester-ether elastomer (C) is prepared by polycondensing
  (d) one or more dicarboxylic acids and/or derivatives therefrom capable of forming esters containing at least 70 mol % of terephthalic acid and/or its derivative capable of forming esters,
  (e) an alkylene glycol, and
  (f) a polyalkyleneglycol having an average molecular weight of 500 to 5,000
in such a ratio of amounts as the resulting polyester-ether elastomer (C) has a (f) content of 20 to 80% by weight.

5. The polycarbonate composition as set forth in any one of claims 1 to 4, wherein said vinyl monomer (a) is methyl methacrylate.

6. The polycarbonate composition as set forth in any one of claims 1 to 4, wherein said vinyl monomer (a) is acrylonitrile.

7. The polycarbonate composition as set forth in any one of claims 1 to 4, wherein said vinyl monomer (a) is styrene.

8. The polycarbonate composition as set forth in any one of claims 1 to 4, wherein said polyfunctional vinyl compound (b) is divinylbenzene.

9. The polycarbonate composition as set forth in any one of claims 1 to 4, wherein said acrylic ester in (c) is butyl acrylate.

10. The polycarbonate composition as set forth in any one of claims 1 to 4, wherein said acrylic ester in (c) is 2-ethylhexyl acrylate.

11. The polycarbonate composition as set forth in any one of claims 1 to 4, wherein the average particle size of said isoprene-base graft copolymer (B) is 0.1 to 0.3 µm.

12. The polycarbonate composition as set forth in claim 3 or 4, wherein said aromatic polyester resin (D) is polyethyleneterephthalate.

13. The polycarbonate composition as set forth in claim 3 or 4, wherein said aromatic polyester resin (D) is polybutyleneterephthalate.

* * * * *